United States Patent [19]
Fukamachi et al.

[11] Patent Number: 5,657,673
[45] Date of Patent: Aug. 19, 1997

[54] INNER PRESSURE FILLING APPARATUS FOR TIRE-RIM ASSEMBLY

[75] Inventors: Yoshihiro Fukamachi, Nagasaki-ken; Kenjiro Yamaya, Tokyo, both of Japan

[73] Assignee: Bridgestone Corporation, Tokyo, Japan

[21] Appl. No.: 597,183

[22] Filed: Feb. 6, 1996

[51] Int. Cl.$^6$ .................................................. B60C 25/132
[52] U.S. Cl. ............................................ 157/1.17; 157/1.26
[58] Field of Search ............................. 157/1, 1.1, 1.2, 157/1.17, 1.22, 1.24, 1.26, 1.28

[56] References Cited

U.S. PATENT DOCUMENTS

| | | | |
|---|---|---|---|
| 3,774,664 | 11/1973 | Matysak | 157/1.1 |
| 5,146,969 | 9/1992 | Kawabe et al. | |
| 5,224,532 | 7/1993 | Kawabe et al. | |
| 5,287,907 | 2/1994 | Kawabe et al. | |

*Primary Examiner*—D. S. Meislin
*Attorney, Agent, or Firm*—Sughrue, Mion, Zinn, Macpeak & Seas

[57] ABSTRACT

An inner pressure filling apparatus for a tire-rim assembly comprises a support table which is removably fixed to a base plate via a clamp and is easily replaceable; an outer cylinder which is easily replaceable and of which upper peripheral edge is inclined with respect to a vertical-direction axis of the outer cylinder; an elevator device formed by one cylinder which moves upward and downward and a plurality of springs; an air filling device for filling pressurized air into a tire of the tire-rim assembly; and a control device supplying pressurized air into the elevator device and the air filling device to move the elevator device upward and downward and controlling the elevator device and the air filling device so as to actuate the air filling device to fill pressurized air into the tire. Accordingly, the inner pressure filling apparatus as a whole becomes simple in construction and enables simple replacement of the base plate and the outer cylinder in accordance with the size of the tire-rim assembly.

6 Claims, 9 Drawing Sheets

INNER PRESSURE FILLING APPARATUS FOR TIRE-RIM ASSEMBLY

BACKGROUND OF THE INVENTION

1. Field of the Invention

The present invention relates to an inner pressure filling apparatus for filling pressurized air into an interior portion of a tire-rim assembly with a pneumatic tire being fitted on a rim. More particularly it relates to an inner pressure filling apparatus which is capable of uniformly bringing a bead portion of a pneumatic tire into close contact with a rim during filling of pressurized air into the interior portion of the tire-rim assembly.

2. Description of the Related Art

An inner pressure filling apparatus for a tire-rim assembly in which a pneumatic tire is merely fitted on a wheel rim has been disclosed mainly in Japanese Patent Application Publication No. 53-23563 and Japanese Patent Application Laid-Open No. 5-58123 filed by the assignee of the present application.

These disclosed prior art apparatus each have drawbacks as will be described hereinafter.

(1) Japanese Patent Application Publication No. 53-23563

This prior art apparatus is constructed in that a tire-rim assembly is mounted on a table which is movable upward and downward, and pressurized air is filled in an internal space of a tire from an upper side thereof through an air-tight ring or the like, which corresponds to an outer cylinder of the present invention. In this arrangement, the tire-rim assembly is disposed between upper and lower sections of the apparatus. For this reason, an entire construction of the apparatus becomes complicated and the apparatus is expensive to manufacture.

Further, since a peripheral edge of the above-described air-tight ring is not inclined with respect to a vertical direction axis, it is difficult for a bead seat of a wheel rim and a bead portion of a tire to be uniformly brought into close contact with each other. Thus, in most cases, the inherent performance of the tire could not be obtained.

(2) Japanese Patent Application Laid-Open No. 5-58123

The prior art disclosed therein is constructed in that a mounting mechanism of a taper cone which corresponds to a center guide of the present invention to center a wheel rim on a mounting table is complicated, and the wheel rim is centered by being pressed against the mounting table by a cylinder, while the taper cone is engaged with a hub hole on a disk of the wheel rim from an upper side of the apparatus.

For this reason, the wheel rim is hard to move, thereby making it somewhat difficult to center the wheel rim.

Further, since an outer cylinder member is adapted to be movable upward and downward, an entire construction of the apparatus becomes complicated and the apparatus is expensive to manufacture. It is necessary to replace the mounting table and the outer cylinder member of the apparatus if the rim diameter of the tire varies. However, it is difficult to replace the mounting table and the outer cylinder member and significant time is required for replacement thereof.

With this arrangement of the prior art, pressurized air to be supplied into the tire when the bead portion of the tire and the bead seat of the wheel are brought into close contact with each other is provided to be supplied only through a clearance formed between the wheel and the bead portion with the annular outer cylinder member for filling inner pressure having an inclined portion at a distal end thereof being pressed against the bead portion of the tire. Thus, there exists a drawback in that the bead portion on the side where the outer cylinder member is pressed against the tire is not uniformly brought into close contact with the bead seat of the wheel.

As described above, these prior art devices both have respective problems to be solved.

SUMMARY OF THE INVENTION

In view of the aforementioned, it is an object of the present invention to provide an inner pressure filling apparatus for a tire-rim assembly, which eliminates the problems of the prior art, and which is simple in construction and in which size replacement can be performed in a short time and a bead seat of a wheel rim and a bead portion of a tire are uniformly brought into close contact with each other with high accuracy so that the inherent performance of the tire can be exhibited.

In order to achieve the above-described object, there is provided, in accordance with a first aspect of the present invention, an inner pressure filling apparatus for a tire-rim assembly in which a pneumatic tire is only fitted on a wheel rim, comprising: a support table supporting a recurved outer edge of a lower flange of the wheel rim and enabling air-tight sealing of the tire-rim assembly, the support table having at least one spring therebelow via a base plate to which the support table is removably fixed by a clamp and being provided to be movable upward and downward; an annular outer cylinder surrounding the support table around the lower flange of the wheel rim and having a peripheral edge which abuts against a lower side wall of the tire disposed near a bead portion so as to air-tightly seal the tire, the peripheral edge being inclined with respect to a vertical-direction axis of the outer cylinder; elevator means having a center guide for centering the wheel rim with the center guide engaging with a hub hole of a disk of the wheel rim from a lower side, the elevator means holding the disk of the wheel rim between the center guide and a cap and pressing the recurved outer edge of the lower flange of the wheel rim against the support table so as to move the support table downward against the urging force of the at least one spring; air filling means for filling pressurized air into the tire through a valve opening of the wheel rim, or through the valve opening, a clearance between the outer cylinder and the support table, and a clearance formed between a bead portion of the tire and a lower bead seat of the wheel rim by the peripheral edge of the outer cylinder pushing up the lower side wall of the tire disposed near the bead portion in an upward direction in response with downward movement of the support table; and control means for controlling supply of pressurized air into the air filling means and the elevator means.

In accordance with a second aspect of the present invention, in the inner pressure filling apparatus for a tire-rim assembly of the first aspect, a dimension of a circumferential difference between an inner periphery of the peripheral edge of the outer cylinder and an outer periphery of the support table is set in a range which exceeds 0 and which is less than or equal to 15 mm. As a result, the object of the present invention can be achieved even more effectively.

DESCRIPTION OF THE PREFERRED EMBODIMENTS

Figure 1:
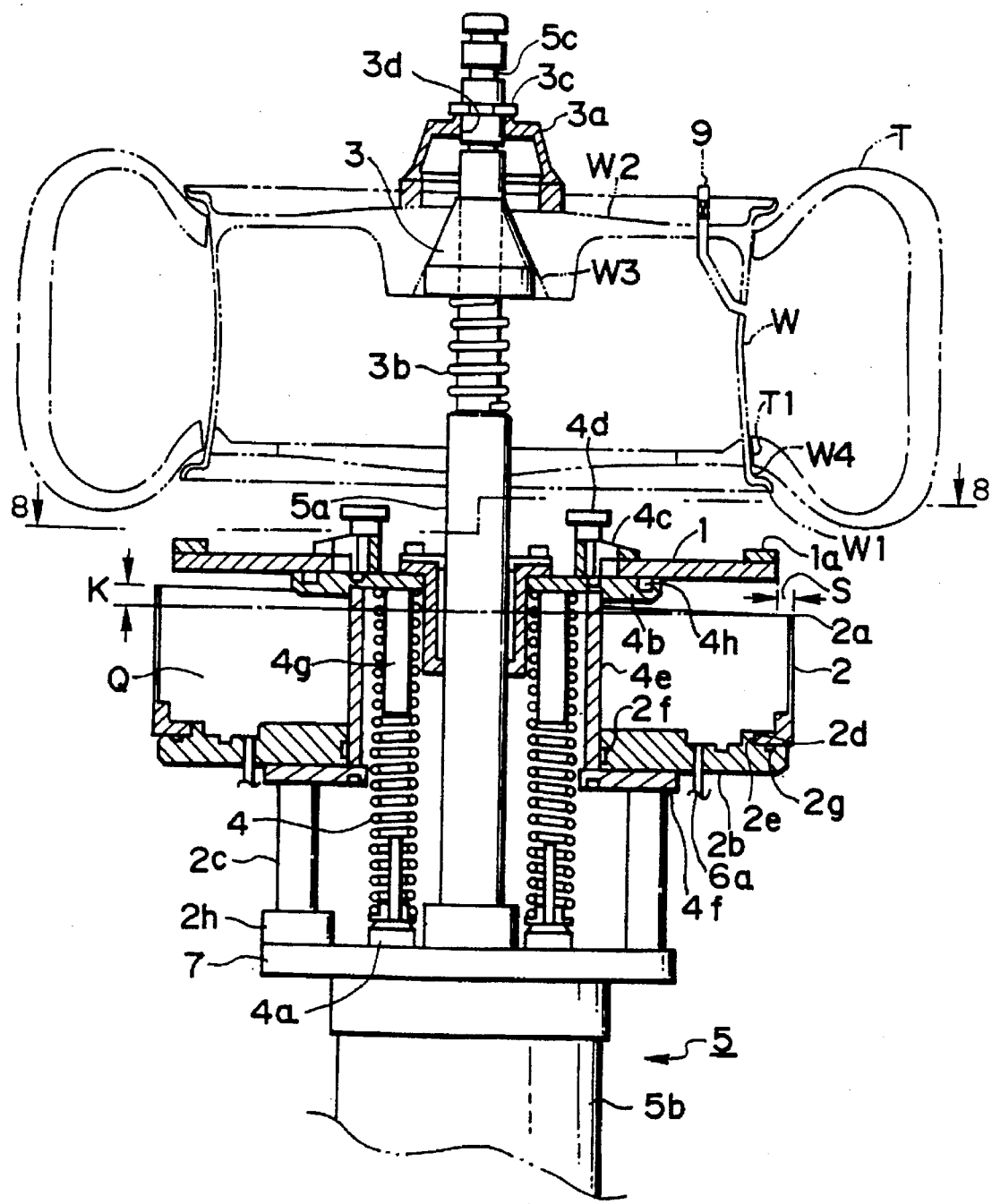
FIG. 1 is an overall structural view of an inner pressure filling apparatus for a tire-rim assembly according to the present invention.

FIG. 1 shows an overall structure of an inner pressure filling apparatus for a tire-rim assembly according to the present invention.

A support table 1 formed of a doughnut-shaped plate having a circular through hole at a central portion thereof includes an annular seat 1a in a vicinity of an outer edge of the support table 1 on an upper surface thereof. The tire-rim assembly mounted on the support table 1 is constructed in that a recurred outer edge W1 of a lower flange of a wheel rim W is supported on the seat 1a to be air-tightly sealed on both sides of the wheel rim W.

The support table 1 is fixed by a clamp 4c to a base plate 4b to be easily removable and the base plate 4b is urged upward by a spring 4.

Namely, the support table 1 is constantly urged upward by the spring 4 via the base plate 4b. However, when external force greater than the urging force of the spring 4 is applied to the base plate 4b from an upper side of the apparatus, the support table 1 moves downward. Thus, the support table 1 is provided to be movable in a vertical direction.

An outer cylinder 2 is formed in that a peripheral edge 2a is inclined with respect to the vertical direction axis by a dimension K of a difference in height of the peripheral edge 2a and is formed to surround the support table 1 in a state in which the outer cylinder 2 is separated from the support table 1 radially in an outward direction by a distance S in a circumferential difference between an outer periphery of the support table 1 and an inner periphery of the peripheral edge 2a.

A substantially truncated center guide 3, in which a rod 5a forming a part of an elevator means 5 passes through a through hole of the center guide 3 in a slidable manner on a wall surface thereof, is urged upward by a spring 3b coiled around a small diameter portion of the rod 5a. When the wheel rim W is placed on the center guide 3 in a manner in which a hub hole W3 of the wheel rim W enters from an upper portion of the rod 5a, a tapered portion formed on an upper surface of the center guide 3 and the hub hole W3 are engaged with each other and the wheel rim W is centered by the action of the tapered portion.

Subsequently, when a substantially truncated cap 3a having a circular through hole at a central portion thereof is fitted on the rod 5a from an upper direction thereof, a disk W2 of the wheel rim W is held between the cap 3a and the center guide 3 and the rod 5a is moved downward by a cylinder 5b forming a part of the elevator means 5. As a result, the recurred outer edge W1 of the wheel rim W at the lower side thereof abuts against the seat 1a and the support table 1 together with the wheel rim W moves downward against the urging force of the spring 4.

At this time, the outer cylinder 2 is fixed not to move. However, when the peripheral edge 2a abuts against a lower side surface of the tire T on the side near a bead portion relatively in response with the downward movement of the support table 1 and the lower side surface of the tire T is pushed up while an interior portion of the outer cylinder 2 is sealed in an air-tight manner, a clearance is formed between a lower bead portion T1 and a lower bead seat W4 and pressurized air is fed into the tire T through the clearance from a piping 6a which forms a part of the air filling means. Also, pressurized air is synchronously fed from a valve opening 9 of the wheel rim W.

Alternatively, pressurized air can be fed into the tire only from the valve opening 9 not to be fed from the above-described clearance as the case may be.

Next, a description will be given of a structure and an operation of a control system 8 for controlling supply of pressurized air into the air filling means 6 and the elevator means 5.

Figure 2:
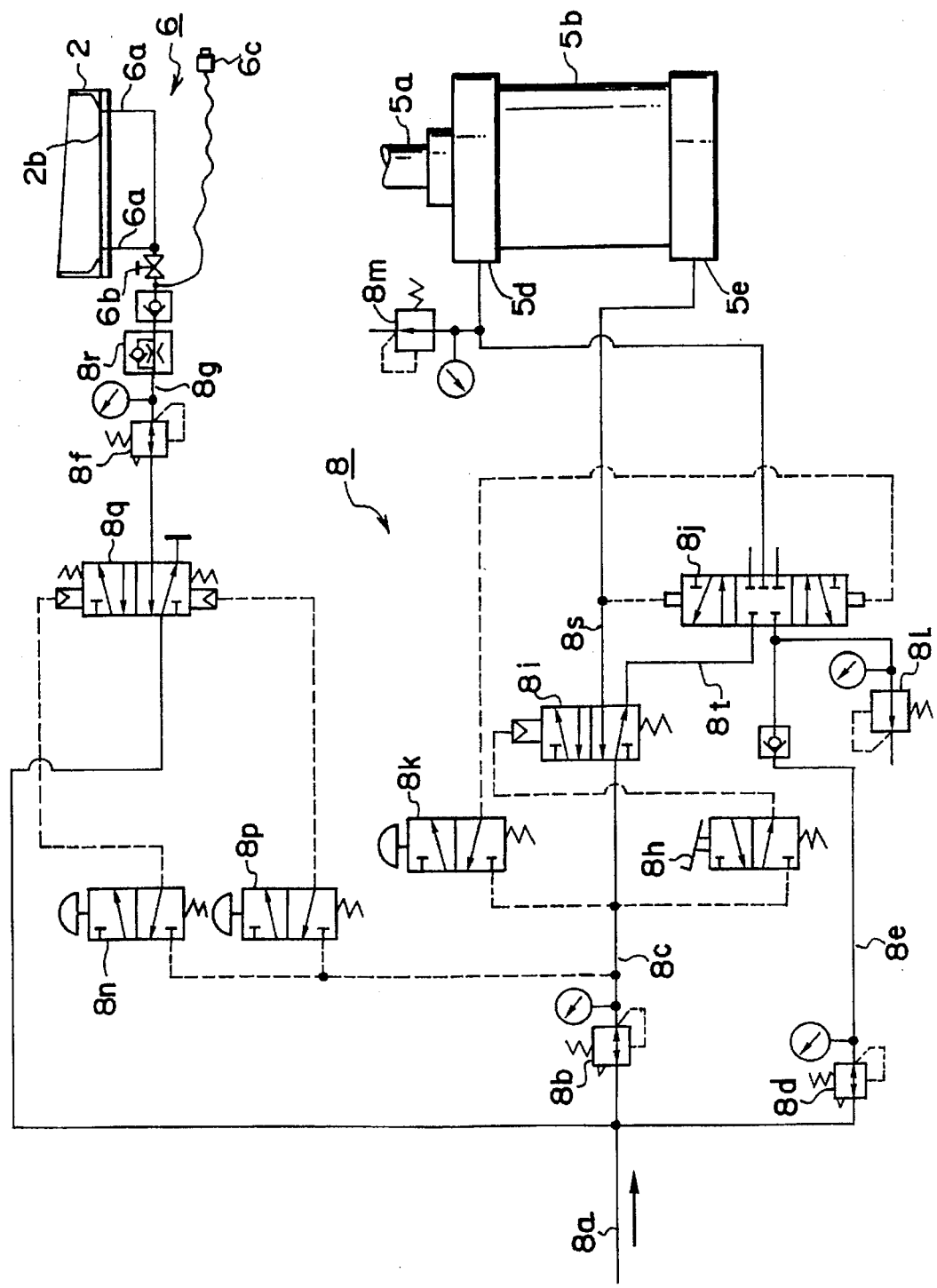
FIG. 2 is a diagram of a control means for controlling supply of pressurized air into an air filling means and an elevator means.

In FIG. 2, piping 8a connected to a pressurized air source is usually fed with air pressure of 7 Kgf/cm². The piping 8a is divided into three path ways: the first is piping 8c which serves as a high-pressure air source for actuating the cylinder 5b, in which air pressure is reduced by a pressure reducing valve 8b to, for example, 5 to 5.5 Kgf/cm² or thereabouts; the second is a piping 8e which serves as a low-pressure air source for actuating the cylinder 5b, in which air pressure is reduced by a pressure reducing valve 8d to, for example, 1.5 Kgf/cm² or thereabouts; and the third is a piping 8g for supplying pressurized air at a flow rate of 1,00 l/min. or less into the piping 6a forming a part of the air filling means 6 and a supply opening 6c through a flow metering valve 8r, in which air pressure is reduced by a pressure reducing valve 8f to 4 Kgf/cm² or less.

The procedure for filling inner pressure into the tire will be explained hereinafter with reference to FIG. 2 and FIGS. 3 through 7 which are explanatory views of operational steps for filling inner pressure into the tire.

When a foot switch 8h shown in FIG. 2 is pressed down and a switching valve 8i is switched, high pressure air flows through piping 8s and is supplied into an air opening 5e of the cylinder 5b. And synchrohously, a switching valve 8j is also switched and an air opening 5d of the cylinder 5b is brought into an air-open state.

Figure 3:
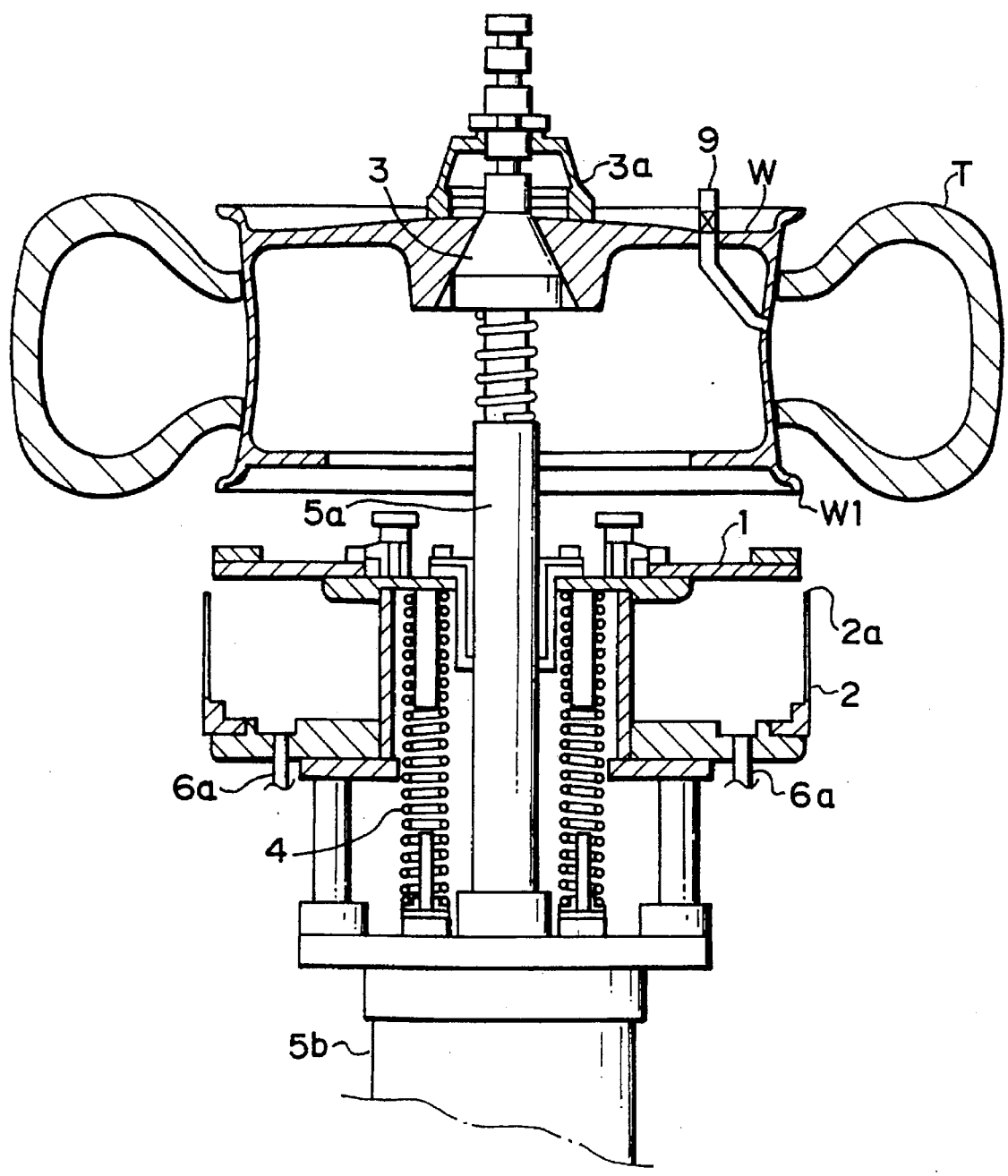
FIGS. 3 through 7 are explanatory views of operational steps of filling inner pressure into a tire.

As a result, as shown in FIG. 3, the rod 5a is moved to a projecting position. In this state, the tire-rim assembly constructed in that the pneumatic tire T, fitted on the wheel rim W, is placed on the center guide 3 and the tire-rim assembly is centered. Thereafter, the cap 3a is fitted thereon from an outer side and the wheel rim W is thereby held between the center guide 3 and the cap 3a.

When pressure on the foot switch 8h is released, the switching valve 8i is switched and high pressure air flows through a piping 8t. However, the switching valve 8j is not switched. For this reason, high pressure air is supplied into the air opening 5d and the air port 5e is brought into an air-open state.

Figure 4:
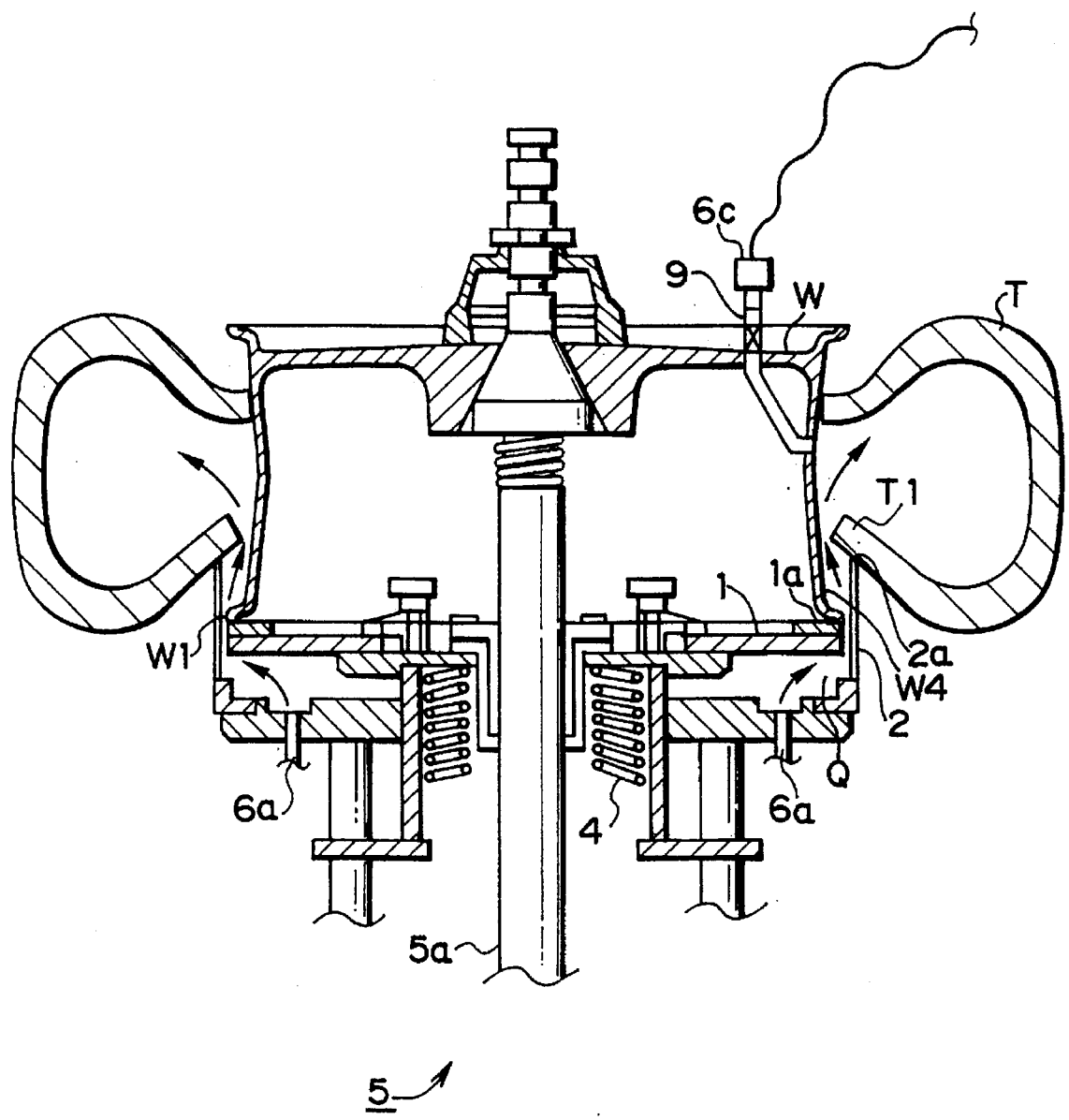

As a result, as shown in FIG. 4, a downward side of the cylinder 5b forming a part of the elevator means is fed with high pressure air and the tire-rim assembly moves downward. The recurred outer edge W1 of the wheel rim W on the lower side thereof abuts against the upper surface of the seat 1a and the support table 1 together with the wheel rim W moves downward against the urging force of the spring 4.

At this time, when the peripheral edge 2a of the outer cylinder 2 abuts against the lower side wall of the tire T on the side near the bead portion T1 and the lower side wall thereof is pushed up relatively while the interior portion of the outer cylinder 2 is sealed in an air-tight manner, the clearance is formed between the bead portion T1 and the bead seat W4.

When a push button switch 8n is pressed down while the supply opening 6c of pressurized air is pressed against the valve opening 9, so long as the push button switch 8n is being pressed, switching valve 8q is switched and pressurized air is thereby supplied into the piping 6a and the supply opening 6c, with the result that inner pressure (pressurized air) is filled into the tire T through the clearance as indicated by arrows in FIG. 4. Also, synchronously, inner pressure is also filled into the tire T from the valve opening 9.

Figure 5:
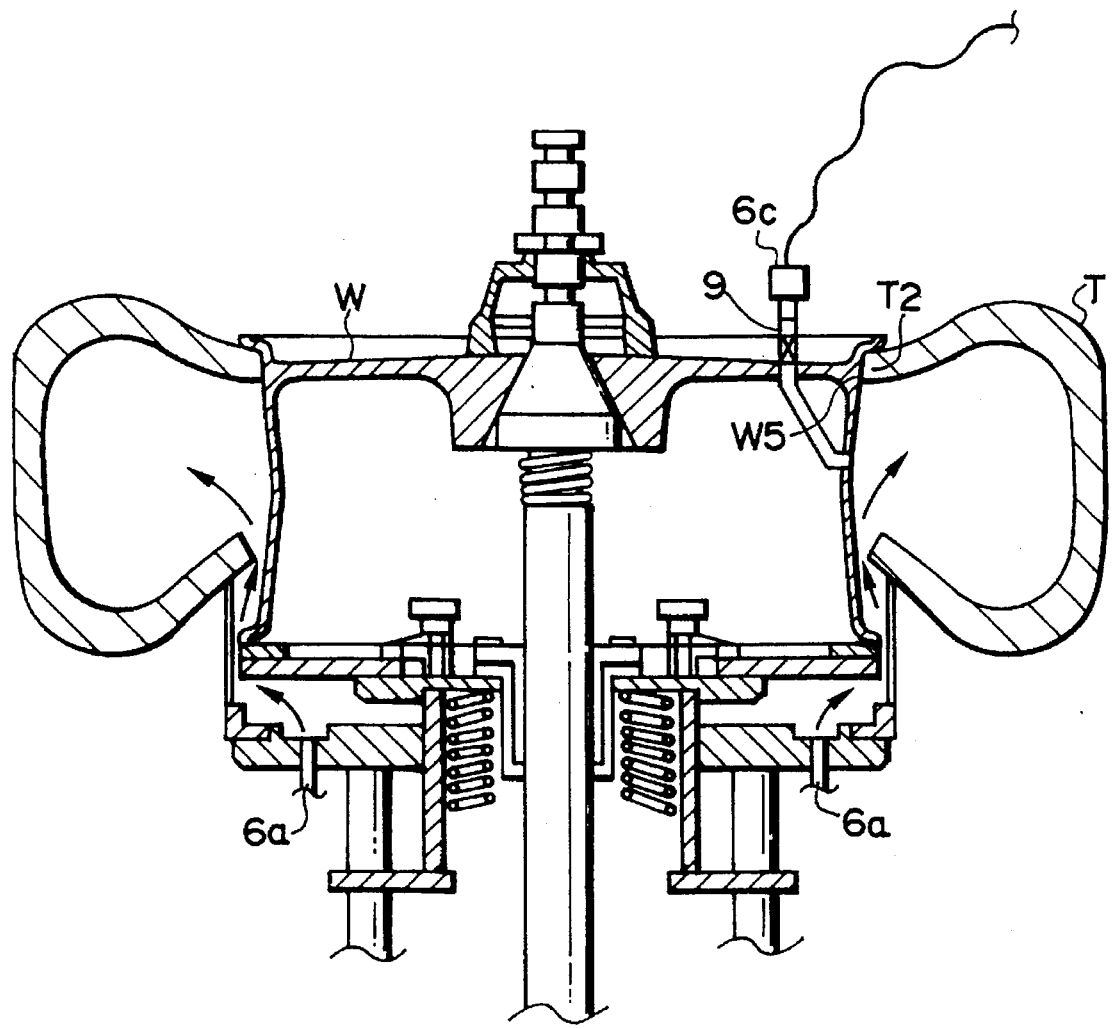

Accordingly, as shown in FIG. 5, first, fitting of an upper bead portion T2 of the tire T on an upper bead seat W5 progresses slowly along the whole circumference of the tire, thereby completing the fitting therebetween.

When a push button switch 8k is pressed down while inner pressure is continuously filled, so long as the push button switch 8k is being pressed, the switching valve 8j is switched and low pressure air is supplied from a low-pressure piping 8e into the air opening 5d, so that descending air pressure of the cylinder 5b is changed to low pressure.

Figure 6:
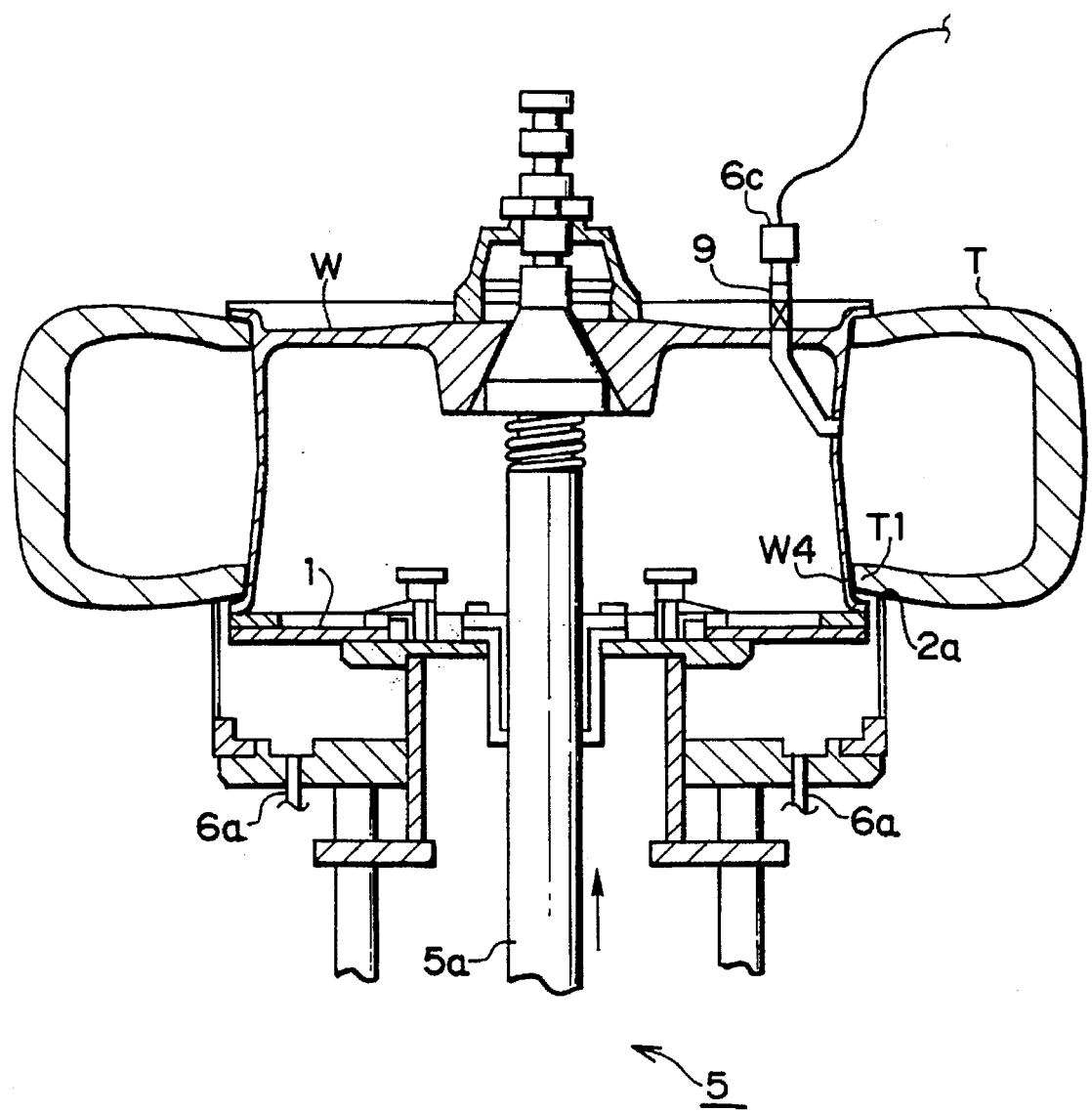

Accordingly, as shown in FIG. 6, a force acting in an upper direction due to the inner pressure of the tire T becomes greater than a force of the cylinder 5b for moving downward the tire-rim assembly and the support table 1 progressively moves upward relatively due to the above-described ascending force. As a result, the lower bead portion T1 begins to be fitted on the lower bead seat W4.

At this time, since the peripheral edge 2a is inclined, the bead portion T1 can be progressively brought into close contact with and fitted on the bead seat W4 without completing fitting therebetween over the whole circumference of the tire at one time. As a result, the fitting of the bead portion T1 and the bead seat W4 can be carried out uniformly and with high accuracy.

When the bead portion T1 and the bead seat W4 are brought into close contact with each other, no clearance therebetween is formed. Even after pressurized air is no longer filled from the clearance, inner pressure is filled from the valve opening 9, with the result that the force is acting which expands the bead portion T1 outwardly. Thus, a force which attempts to bring the bead portion T1 and the bead seat W4 into close contact with each other continuously acts, so that the action in which the bead portion T1 and the bead seat W4 are uniformly brought into close contact with each other operates efficiently.

After the bead portions T1, T2 have been uniformly brought into close contact with and fitted on the bead seats W4, W5, respectively, with pressurized air of a low flow rate (for example, 30l/min.) in the above-described manner, when the push button switches 8n and 8k are released at the time when air pressure has become a predetermined normal inner pressure in accordance with a tire size, the switching valve 8q is switched and the supply of air into the piping 6a and the supply opening 6c stops.

Thereafter, the supply opening 6c is moved away from the valve opening 9.

The control system 8 is mainly comprised of the pressure reducing valves 8b, 8d, 8f, the push button switches 8n, 8p, the foot switch 8h, the switching valves 8g, 8i, 8j, and the like. The air filling means 6 is comprised of the piping 6a, the valve 6b and the supply opening 6c.

Figure 7:
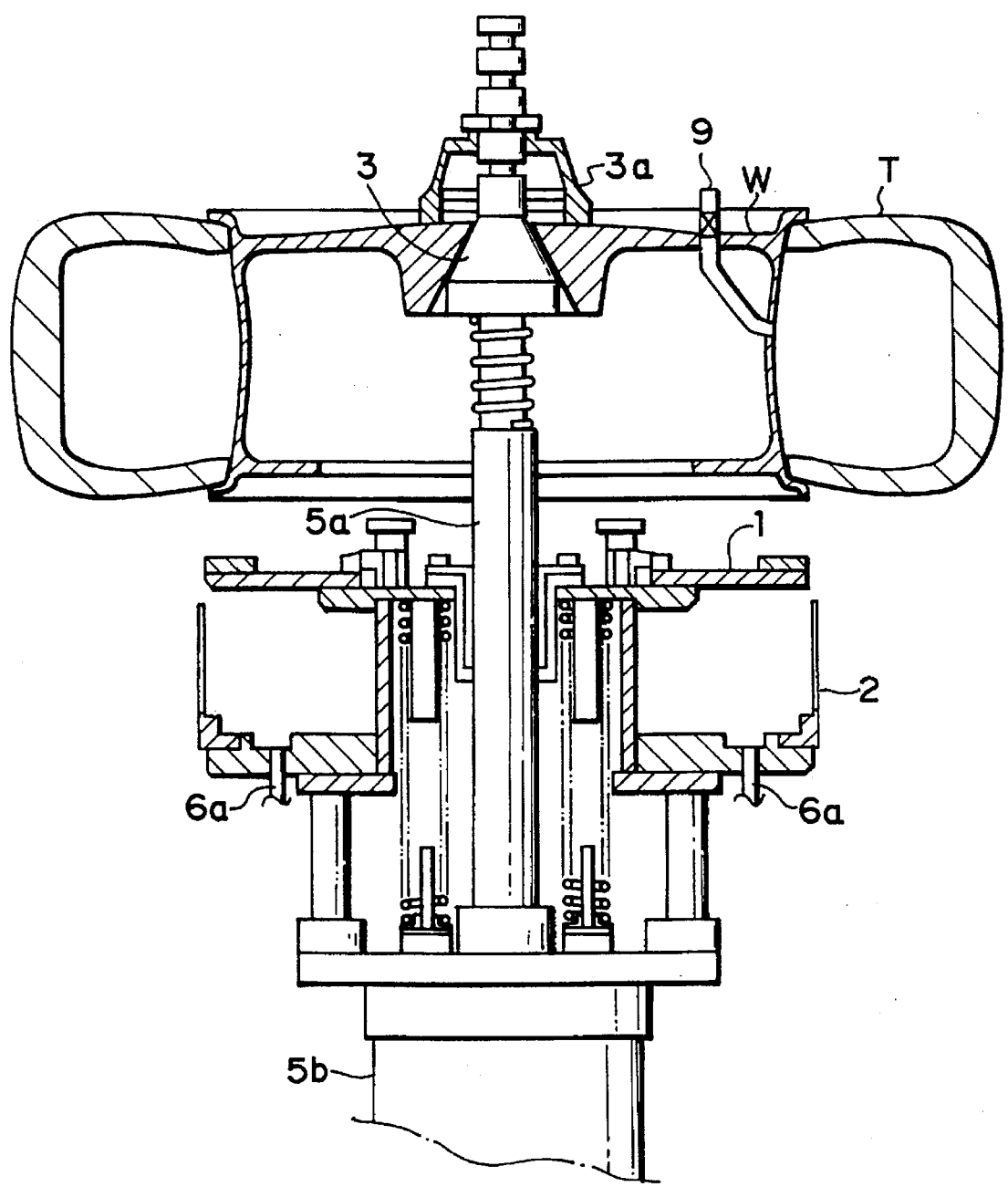

When the foot switch 8h is pressed down, the switching valves 8i and 8j are switched, i.e., the supply of air into the cylinder 5b is changed to an ascending air flow. As shown in FIG. 7, the tire-rim assembly is raised to a position spaced apart from the support table 1. Thus, a series of operations of the inner pressure filling apparatus according to the above-described first aspect are finished.

After the above-described operations, the cap 3a is removed and the tire-rim assembly filled with inner pressure is raised up to a position above the rod 5a to be removed.

When inner pressure is filled into the tire T only from the supply opening 6c while the supply opening 6c is being pressed against the valve opening 9, it suffices to first close the valve 6b shown in FIG. 2 and remaining operations can be effected in the same manner as aforementioned described.

Meanwhile, it can be recognized that, as a result of various experimental studies, when the above-described circumferential difference between the outer periphery of the support table 1 and the inner periphery of the peripheral edge 2a of the outer cylinder 2 is set in a range which exceeds 0 and is less than or equal to 15 mm, the lower bead portion T1 and the lower bead seat W4 can be uniformly brought into close contact with each other with high accuracy along the entire circumference of the tire, as shown in the inner pressure filling apparatus according to the second aspect of the present invention.

Specifically, in filling inner pressure into an assembly comprised of a tire with a rim protector and a wheel rim, the above-described circumferential difference is properly in a range of 10 mm to 15 mm. In filling inner pressure into an assembly comprised of a normal tire (having no rim protector) and a wheel rim, the circumferential difference is properly set in a range of 1 mm to 5 mm.

Next, the present embodiment will be further described in detail.

In FIG. 1, the annular seat 1a integrally formed with the support seat 1 in the vicinity of the outer edge of the support seat 1 on the upper surface thereof is made of elastic materials, for example, elastomers such as rubber, urethane or the like.

The support table 1 is fixed in a state of being pressed by three clamps 4c disposed on an upper surface of the base plate 4b substantially at even intervals. Accordingly, when the clamps 4c are released, the support table 1 is provided to be easily removable. An O-ring 4h is provided on an upper surface of the base plate 4b to prevent pressurized air within a space Q from leaking out from an abutment surface between the support table 1 and the base plate 4b.

Figure 8:
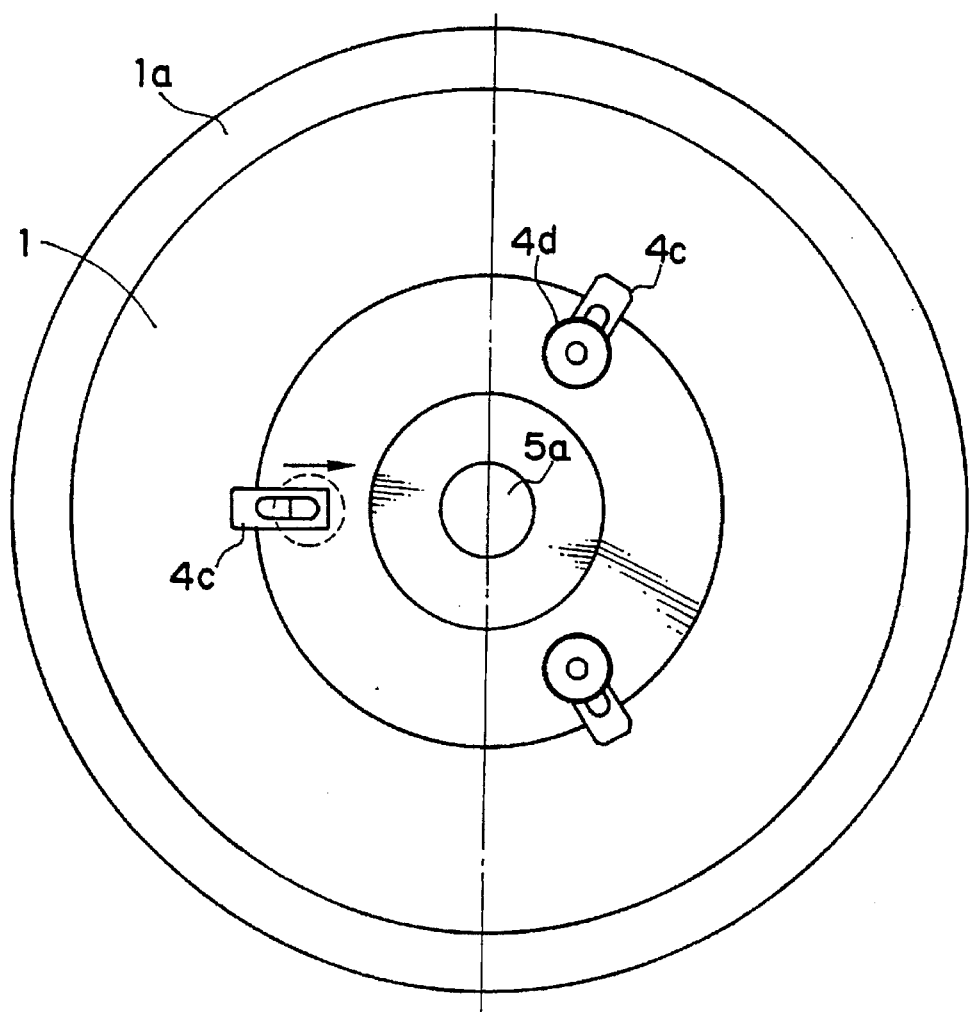
FIG. 8 is a cross-sectional view taken along arrows 8—8 in FIG. 1.

Since the clamps 4c are provided to press the support table 1 against the base plate 4b by means of thread-fastening force of a knob 4d, if only the knob 4d is slightly loosened to approximately make a half turn and the clamps 4c move outward in the outward direction (see FIG. 8), the support table 1 can be released from being pressed by the clamps 4c to be easily replaced with another support table having a different outer diameter.

Meanwhile, the number of clamps 4c is not limited to three, and can be set to, for example, two, four or more.

Round rods 4g are respectively suspended from a lower surface of the base plate 4b in a downward direction and the springs 4 are provided to surround the round rods 4g and to extend in the lower direction, respectively. The springs 4 are each urged to raise the support table 1 upward. A spacer 4a is removably provided on each lower surface of the springs 4. Accordingly, when the spacer 4a is replaced with another spacer having a different height, the urging force of the spring 4 can be easily varied.

In the present embodiment, the number of the round rods 4g and the springs 4b is set to three. However, one large-diameter spring coiled around the rod 5a may be used, or the round rods 4g and the springs 4 as shown in the present embodiment may be each set to two, four or more.

Meanwhile, in place of the round rods 4g and the springs 4, a movable air cylinder may be applied.

A tube 4e and a stopper 4f are integrally formed and fixed by a bolt or the like to a lower surface of the base plate 4b. An outer peripheral surface of the tube 4e and an inner peripheral wall surface of a bottom lid 2b are loosely fitted to each other such that the base plate 4b can move in the vertical direction, but an O-ring 2f is provided on an inner peripheral side of the bottom rid 2b to prevent leakage of pressurized air from the space Q.

The stopper 4f serves to stop the base plate 4b at an upward limit position and a downward limit position.

The outer cylinder 2 is as a whole formed into a substantially cylindrical shape whose cross section of one side has an L-shaped configuration. The outer cylinder 2 can be used only in a state of being centered and mounted on an upper surface of the bottom lid 2b. Namely, since any external force which acts in an upward direction to raise the outer cylinder 2 is not exerted, a mechanism in which the outer cylinder 2 can be used only in a state of being mounted thereon can be applied only if the outer cylinder 2 is adapted not to deviate from the center. As a result, this structure is reasonable and replacement of the outer cylinder can be easily carried out.

An annular convex portion 2e provided concentric with a center hole of the doughnut-shaped bottom lid 2b is formed on an upper surface of the bottom lid 2b. When an inner peripheral surface 2d of the outer cylinder 2 in a bottom portion thereof is loosely fitted to an outer peripheral surface of the convex portion 2e, the bottom lid 2b and the outer cylinder 2 are centered not to deviate from the center.

An O-ring 2g is provided on the upper surface of the bottom lid 2b to prevent leakage of the pressurized air within the space Q from the abutment surface between the lower surface of the outer cylinder 2 and the upper surface of the bottom lid 2b.

As structured in the above-described manner, when the size of the tire-rim assembly is changed, the support table 1 and the outer cylinder 2 both can be easily exchanged in a short time and the circumferential difference S therebetween can be constantly held at a fixed value.

The bottom lid 2b is fixed to a frame plate 7 by four support rods 2c not to move either in a vertical direction or in a horizontal direction. It should be noted that the number of the support rods 2c is not limited to four, and other suitable number thereof can be used.

The dimension of the spacer 2h for determining the downward limit position of the base plate 4b is set such that, when the lower surface of the stopper 4f abuts against the upper surface of the spacer 2h, the base plate 4b is at the downward limit position. Since replacement of the spacer 2h can be easily carried out, it is possible to change the downward limit position of the base plate 4b in a short time as the case may be, by replacing it with another spacer of a different height.

The manner of fixing the cap 3a will be described hereinafter.

Figure 9:
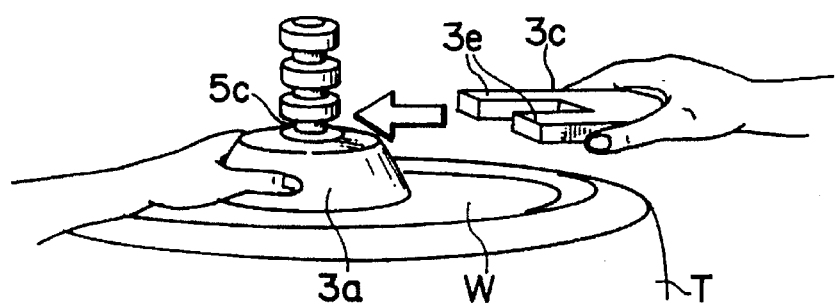
FIG. 9 is a diagram of a stopper.

First, after the center guide 3 and the wheel rim W have been fitted on the rod 5a such that the rod 5a passes through the hole of the center guide 3 and the hub hole W3 of the wheel rim W, the cap 3a is fitted on the rod 5a from an upper portion thereof such that the rod 5a passes through a round hole 3d formed at a central portion of the cap 3a and passing therethrough in the vertical direction. Since a plurality of (for example, four in the present embodiment) annular grooves 5c are formed in an upper portion of the rod 5a, a bifurcated portion 3e of a stopper 3c (see FIG. 9) is engaged with the groove 5c whose wide portion fully appears while the cap 3a is pressed downward against the urging force of the spring 3b until a full width portion of any groove 5c appears from an upper surface of the cap 3a.

In this case, the ascending urging force of the spring 3b is large enough to raise the tire-rim assembly upward. Accordingly, the cap 3a is held with an upper surface thereof being pressed against a lower surface of the stopper 3c by the urging force of the spring 3b in a state in which the disk W2 of the wheel rim W is held between the center guide 3 and the cap 3a. Also synchronously, the stopper 3c is held not to be separated from the groove 5c.

Figure 10:
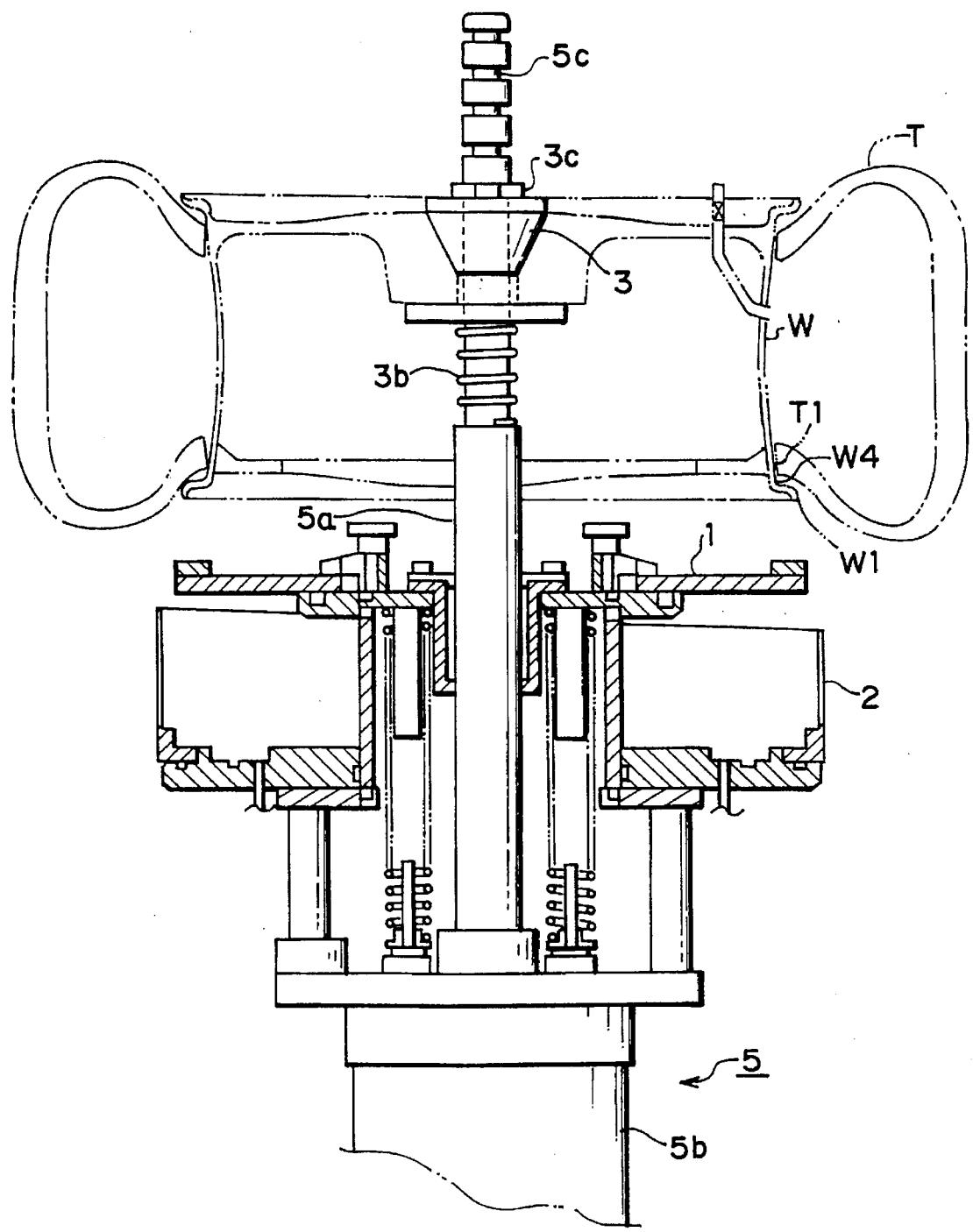
FIG. 10 is a diagram showing another example of how to mount a center guide.

It should be noted that the manner of mounting the cap 3a may be constructed as shown in FIG. 10, in which the hub hole W3 of the wheel rim W is centered by the center guide 3 from an upper side thereof.

A description will be hereinafter given of the control system 8 for controlling the supply of pressurized air into the air filling means 6 and the elevator means 5 and a description of the operations thereof will be omitted.

In FIG. 2, the pressure reducing valves 8b, 8d, 8f are each equipped with a relief valve. When the secondary pressure becomes higher than a set pressure, pressurized air is exhausted out of each relief valve so that the pressure is provided so as not to become higher than the set pressure.

The flow metering valve 8r is formed to control a flow rate of pressurized air supplied into the air filling means 6.

In a case in which air pressure supplied into the air opening 5d of the cylinder 5b is changed from high pressure to low pressure, when it becomes a set low pressure or more, a safety valve 8m operates to exhaust air such that the air pressure does not become higher than the set pressure.

Meanwhile, the control system 8 explained in the present embodiment is operated by a manual switch such as the foot switch 8h, push button switches 8p, 8n, 8k, or the like. However, the control system 8 can also be automatically operated by using a timer, a sequencer or the like.

As described above, since the apparatus according to the present embodiment has a simple structure, the cost of the apparatus becomes approximately one-tenth that of the conventional apparatus. Further, replacement of each component can be carried out in a simple manner and in one minute or thereabouts. As compared with the conventional apparatus in which a large number of mounting bolts are respectively loosened and fastened, the time for replacement is substantially reduced to approximately one twentieth that of the conventional apparatus.

As can be seen from the above explanation, the apparatus according to the present invention makes it possible for the bead seat of the wheel rim and the bead portion of the tire to be uniformly brought into close contact with each other with high accuracy just when inner pressure is filled into the tire-rim assembly. Further, since the apparatus is simple in structure, it can be manufactured at a substantial low cost.

In addition, size replacement can be carried out in an extremely short time, with the result that great effects are obtained on improvement in productivity.

What is claimed is:

1. An inner pressure filling apparatus for a tire-rim assembly in which a pneumatic tire is only fitted on a wheel rim, comprising:

a support table supporting a recurved outer edge of a lower flange of the wheel rim and enabling air-tight sealing of the tire-rim assembly, said support table having at least one spring therebelow via a base plate to which said support table is removably fixed by a clamp and being provided to be movable upward and downward via the at least one spring;

an annular outer cylinder surrounding said support table around the lower flange of the wheel rim and having a peripheral edge which abuts against a lower side wall of the tire disposed near a bead portion to air-tightly seal the tire, the peripheral edge of said annular outer cylinder being inclined with respect to a vertical-direction axis of said outer cylinder;

elevator means having a center guide for centering the wheel rim with the center guide engaging with a hub hole of a disk of the wheel rim from a lower side thereof, said elevator means holding the disk of the wheel rim between the center guide and a cap and pressing the recurved outer edge of the lower flange of the wheel rim against said support table to move said support table downward against the urging force of the at least one spring;

air filling means for filling pressurized air into the tire, a clearance between said annular outer cylinder and said support table, and a clearance formed between a bead portion of the tire and a lower bead seat of the wheel rim as a result of a peripheral edge of said annular outer cylinder pushing up a lower side wall of the tire disposed near said bead portion in an upward direction in response with downward movement of said support table; and control means for controlling a supply of pressurized air into said air filling means and said elevator means.

2. An inner pressure filling apparatus for a tire-rim assembly according to claim 1, wherein a dimension of a circumferential difference between an inner periphery of the peripheral edge of said outer cylinder and an outer periphery of said support table is set in a range which exceeds 0 and which is less than or equal to 15 mm.

3. An inner pressure filling apparatus for a tire-rim assembly according to claim 2, wherein further comprising a rim protector for said tire and wherein, the dimension of the circumferential difference is set in a range of 10 to 15 mm.

4. An inner pressure filling apparatus for a tire-rim assembly according to claim 2, wherein, the circumferential difference is set in a range of 1 to 5 mm.

5. An inner pressure filling apparatus for a tire-rim according to claim 1 wherein said air filling means is operatively coupled a valve opening.

6. An inner pressure filling apparatus for a tire-rim according to claim 1 wherein said air filling means is operatively coupled to a valve opening of said wheel rim.

* * * * *